April 20, 1948.  K. M. HAMMELL  2,440,143
COUPLING FOR SUCTION CLEANER ATTACHMENTS
Filed April 3, 1944  2 Sheets-Sheet 1
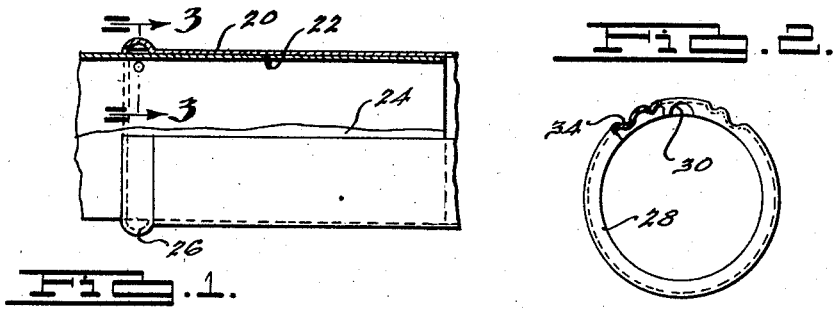
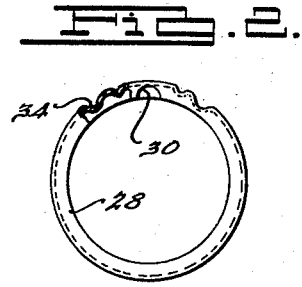
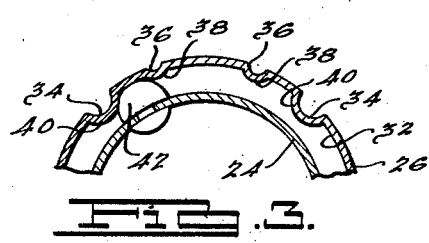
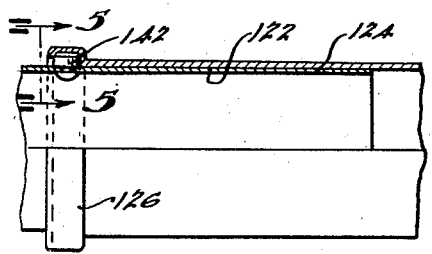
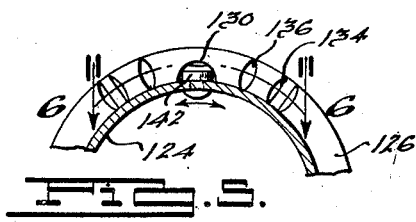
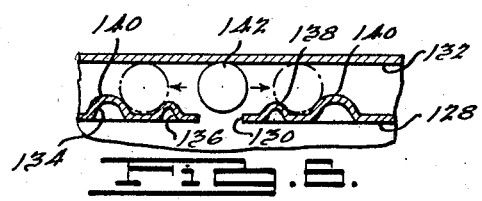
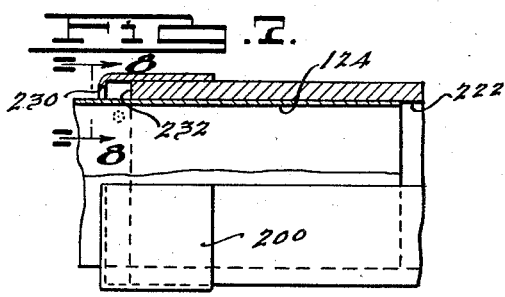
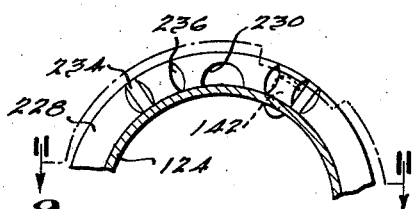
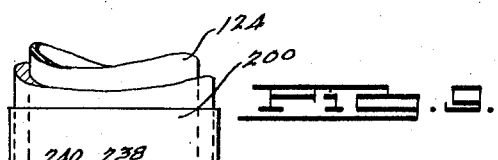
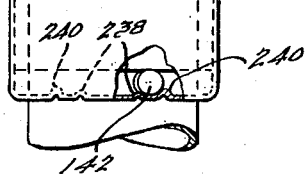
INVENTOR.
Kemper M. Hammell.
BY
Edwin J. Balluff
ATTORNEY.

April 20, 1948.  K. M. HAMMELL  2,440,143

COUPLING FOR SUCTION CLEANER ATTACHMENTS

Filed April 3, 1944  2 Sheets-Sheet 2

INVENTOR.
Kemper M. Hammell.
BY
Edwin J. Balluff
ATTORNEY.

Patented Apr. 20, 1948

2,440,143

UNITED STATES PATENT OFFICE 2,440,143

COUPLING FOR SUCTION CLEANER ATTACHMENTS

Kemper M. Hammell, Detroit, Mich., assignor to Eureka Williams Corporation, a corporation of Michigan Application April 3, 1944, Serial No. 529,357

10 Claims. (Cl. 285—175)

This invention relates to couplings for suction cleaning attachments by means of which suction cleaning tools may be readily detachably connected with and disconnected from a suction hose or a suction cleaner.

Principal objects of the invention are to provide:

A new and improved readily detachable coupling for suction cleaning tools and attachments;

A new and improved coupling which is particularly adapted for suction cleaning tools and which coupling is simple in construction, efficient in operation, and extremely easy to connect and disconnect.

In order to illustrate the invention, a number of particular embodiments have been selected for purposes of illustration although the principle of operation of all is essentially the same. However, in those embodiments illustrated on sheet one of the drawings a remarkable simplicity of design is achieved by relying upon the resiliency of the tools themselves to provide the spring action which materially contributes to the efficiency and ease of operation of the coupling.

For a better statement of the invention reference may be had to the following specification taken in conjunction with the accompanying drawings of which there are two sheets and wherein:

Fig. 1 is a fragmentary view, partially in section, of the coupling as applied to a pair of wands for detachably holding the same together;

Fig. 2 is an end view, partially broken away, of the female or socket part of the coupling;

Fig. 3 is an enlarged fragmentary sectional view taken in a plane along the line 3—3 of Fig. 1, looking in the direction of the arrows;

Fig. 4 is a view similar to Fig. 1 but illustrating a modified form of the invention;

Fig. 5 is an enlarged fragmentary sectional view taken along the line 5—5 of Fig. 4;

Fig. 6 is a developed view taken along the line 6—6 of Fig. 5;

Fig. 7 is a view similar to Fig. 1 but illustrating a modified form of the invention;

Fig. 8 is an enlarged fragmentary sectional view taken along the line 8—8 of Fig. 7;

Fig. 9 is a view taken along the line 9—9 of Fig. 8 but reduced in size;

Figure 10:
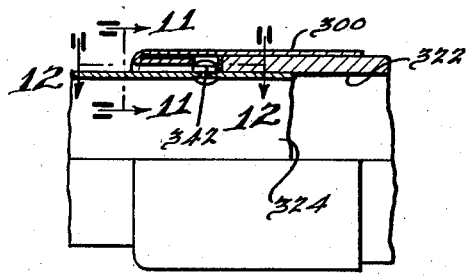
Fig. 10 is a view similar to Fig. 1 but illustrating a modified form of the invention.

As illustrated in Figs. 1, 2 and 3, the inner surface of one end 20 of a tool such as a wand is formed to provide a socket 22 which as illustrated is cylindrical in form. This socket 22 forms a part of a disconnectable coupling which includes a cylindrical end 24 of a tool such as a wand, such end 24 forming the male part of the coupling and being inserted in the socket 22 as illustrated.

The O. D. of the male part 24 is in the neighborhood of .005 to .010 of an inch less than the I. D. of the socket 22 so that one part may be turned fairly readily relative to the other. The clearance between the male part 24 and the socket 22 preferably should be such that the male part may be freely inserted in and removed from the socket 22 and so that when the parts are assembled as illustrated in Fig. 1, there will not be any appreciable wobble or looseness in the joint. The penetration of the male part 24 into the socket 22 should be sufficient so that when such parts are assembled, one of the wands will not appreciably rattle or wobble relative to the other wand when employed for its normal purposes. The clearance between the male part 24 and the socket 22 and the telescoping thereof should be such that the air leakage will be negligible under the pressure differential inside and outside the wands normally encountered in its intended use in connection with vacuum cleaners.

These wands generally are made of cold rolled steel or aluminum tubing of approximately 1¼ inches in diameter. One of the commercially available tubings commonly used for wands and cleaners has a wall thickness which runs about .028 of an inch with a variation of a plus or minus .003. This tubing also frequently is slightly out of round. Therefore the tolerance between the male and female parts of the coupling should be such as to take into consideration the foregoing factors.

The socket 22 at its end terminates in a bead 26, the end radial wall 28 of which is cut away to provide a notch 30. The inside of the bead 26 forms a groove 32 which on each side of the notch 30 is provided with a pair of radially extending indentations or embossings 34 and 36 which project into the groove and provide a detent 38 and a stop 40. The space in the groove 32 between the detent 38 and stop 40 forms a notch. The male part 24 of the coupling is provided with a rounded pin or member 42 projecting radially from the exterior thereof and substantially spaced from the end which penetrates the socket 22. This pin or member may comprise a double headed rivet which is secured in a suitable hole in the part 24. Lengthwise of the part 24 the pin or member 42 has a cross section in form corresponding to that of the groove 32. The notch 30 is of a size sufficient to permit the pin 42 to pass into the groove 32 when aligned therewith when the part 24 is inserted in the socket 22. The detents 38 formed by the indentations 36 in the wall of the bead 26 project into the groove 32 only a relatively small amount as compared with the stops 40.

The wall of the bead 26 opposite that in which the notch 30 is formed is adapted to limit the penetration of the part 24 into the socket 22. Thereafter by rotating the part 24 relative to the socket 22 the pin 42 may be caused to pass the detent 38 and come to rest in the notch between the detent 38 and the stop 40. The stops 38 and 40 are spaced sufficient to accommodate the pin 42 therebetween. As the detent 38 projects only a relatively small amount into the groove 32, the walls of the male part 24 carrying the pin 42 or the walls of the bead 26 or both may be distorted sufficiently to permit the pin 42 to pass the detent 38 in the groove while the stop 40 will prevent any further rotation in such direction.

It will be observed that on each side of the notch 30 the groove 32 is provided with a detent 38 and a stop 40 so that after the male part 24 is inserted in the socket 22 the pin 42 may be rotated in either direction, thereby to lock the parts of the coupling together. By reversing the steps involved in assembling the coupling, the same may be disassembled.

In the embodiment illustrated in Figs. 4, 5 and 6, the construction may be the same as that previously illustrated except in the following particulars. In this embodiment the female or socket part 122 of the coupling is adapted to receive the male part 124 as in Fig. 1. The bead 126 formed on the end of the socket is generally rectangular in cross section and the pin 142 corresponds in shape and size to the groove 132 provided by the inside of the bead 126. Indentations 134 and 136 corresponding to the indentations 34 and 36 are formed in the end wall 128 of the bead and extend axially into the groove 132 rather than radially as in the case of Fig. 1. The indentations 134 and 136, like the corresponding parts in Fig. 1, provide a detent 138 and a stop 140 internally of the groove 132 and on each side of the notch 130 in the wall 128 through which the pin 142 may be inserted into the groove 132. The detents 138 and stops 140, like the corresponding detents 38 and stops 40 of Fig. 1, are spaced sufficiently to provide a notch for accommodating the pin 142 therebetween, the stop 140 preventing movement of the pin 142 further into the groove 132.

In the modification illustrated in Figs. 7, 8 and 9, the construction and mode of operation is very much the same as that illustrated in the preceding modification, except that in this instance the socket 222 is provided by a relatively thick walled tubular member such as might be formed on one of the suction cleaning tools. The male part 124 with its pin 142 may be identical with that illustrated in the preceding modification. In this case the groove 232 corresponding to the groove 132 is provided by an annular ring 200 fitting over the end of the socket 222 and having a wall 228. The ring 200 may be formed out of the same gauge of metal as the male part 124 of the coupling. The wall 228 is provided with a notch 230 through which the pin 142 may be inserted into the groove 232, and the wall 228 is provided with indentations 236 and 234 corresponding to the indentations 136 and 134 in Fig. 6 to provide the detents 238 and stops 240 corresponding to the detents and stops 138 and 140 in Fig. 6. The ring 200 may be press fitted over the end of the tubular part which forms the socket 222.

Figure 11:
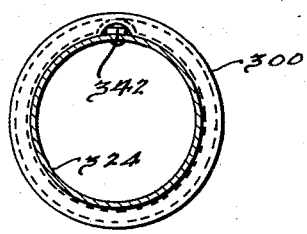
Fig. 11 is a section taken in a plane along the line 11—11 of Fig. 10.
Figure 12:
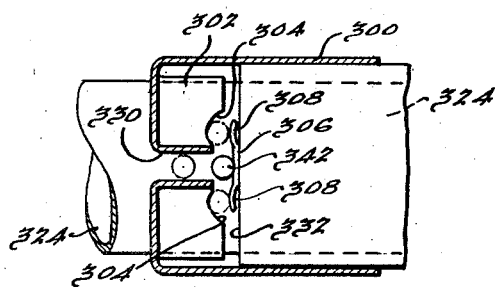
Fig. 12 is a developed view taken along a radius indicated by the line 12—12 of Fig. 10.

In the embodiment illustrated in Figs. 10, 11 and 12, which is a modification of that illustrated in Figs. 7, 8 and 9, the socket 322 may be provided by a relatively thick walled tubular member while the male part 324 may be the same as those previously described with substantially the same fit in the socket 322. A ring 300 is fitted on to the end of the socket 322 and is provided with a reentrant portion 302 having a groove 330 therein through which the pin 342 may be inserted into the groove 332 defined between the end of the socket member 322 and the spaced end of the reentrant portion 302 of the sleeve 300.

Such reentrant portion is provided with notches 304 which are adapted to receive the pin 342. A spring 306 having bowed ends 308 and secured to the end wall of the socket 322 is adapted to hold the pin 342 in either of the notches 304, the bowed ends 308 of the spring functioning as a detent similar to that of the detents 38, 138, etc. In this case the groove 332 is of lesser width than that of the pin 342 so that the pin 342 may not be turned past either of the notches 304. When the pin 342 is aligned with the groove or slot 330 the parts of the coupling may be separated.

Figure 13:
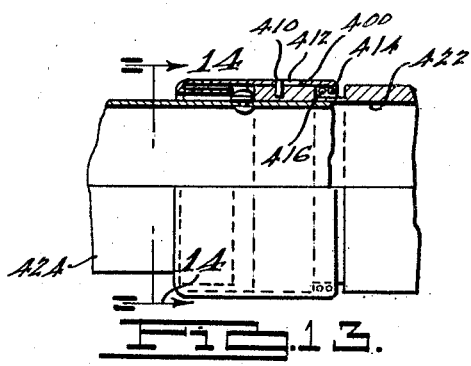
Fig. 13 is a view similar to Fig. 1 but illustrating another modified form of the invention.
Figure 14:
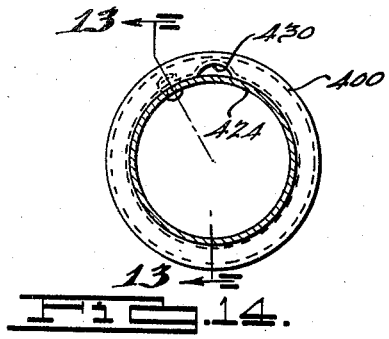
Fig. 14 is a view taken along the line 14—14 of Fig. 13.
Figure 15:
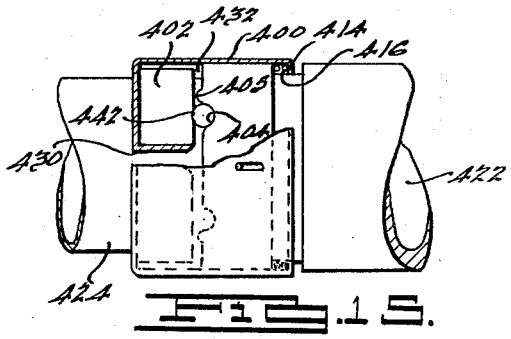
Fig. 15 is a plan view of Fig. 13 with certain parts broken away.

In the embodiment illustrated in Figs. 13, 14 and 15, which is a modification of that illustrated in Fig. 10, the sleeve 400 is axially shiftable on the end of the socket member 422. The pin 410 projecting outwardly from the socket member 422 and working in a slot 412 in the sleeve 400 limits the axial shifting of the sleeve 400 relative to the socket member 422. One end of the sleeve is flanged inwardly as at 414 into an annular groove in the exterior of the socket member 422 and a spring 416 confined between the flanged end 414 of the ring 400 and the opposite end of the groove in the socket member 422 biases the sleeve 400 to the right, looking at Fig. 13, relative to the socket 422.

The sleeve 400 is provided with a reentrant portion 402 and between the inner edge of this and the end of the socket 422 a groove 432 is provided. The end of the socket member 422 is provided with a notch 404 and a stop 405 on each side of the notch or groove 430 by means of which the pin 442 on the male part of the coupling may be inserted into the groove 432. The groove 432 normally is narrower than the pin 442 due to the action of the spring 416 so that when the male part 424 of the coupling is turned relative to the socket 422, the pin 442 bearing against the end of the reentrant portion 402 of the sleeve 400 and the end surface of the socket 422 will cause the sleeve 400 to shift sufficiently to permit the pin 422 to enter one of the notches 404. Thereafter the action of the spring 416 on the sleeve 400 will retain the pin 442 in the notch 404 until sufficient rotative force has been applied to align the pin 442 with the slot 430, when the parts of the coupling may be separated.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a coupling for suction cleaner attachments, a thin walled tube forming an air conducting male coupling member, an air conducting socket coupling member adapted to telescopically and freely rotatably receive said male coupling member, the end of said socket coupling member being formed to provide an annularly extending internal groove having an entrance opening in the end wall thereof, the walls of said groove being formed to provide a notch at each side of said entrance opening and a detent between said entrance opening and each of said notches, said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past one of said detents into one of said notches, said thin walled tube being adapted to distort when said detent is pressed against said pin by a relative rotational force applied to said coupling members so as to permit said pin to move past said detent into or out of one of said notches, the resiliency of the material out of which said thin walled tube is formed permitting temporary displacement of said pin while moving past said detent.

2. In a coupling for suction cleaner attachments, a thin walled tube forming an air conducting male coupling member, an air conducting socket coupling member adapted to telescopically and freely rotatably receive said male coupling member, at least the end of said socket coupling member being formed by a thin walled tubular part, said end of said socket coupling member being provided with an annularly extending internal groove formed at least in part by said thin walled tubular part and having an entrance opening in the end wall thereof, the walls of said groove being formed to provide a notch at each side of said entrance opening with a detent between said entrance opening and each of said notches, said detent being formed by an embossing in said thin walled tubular part and said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past one of said detents into one of said notches, said thin walled tube and tubular part being adapted to distort when said detent is pressed against said pin by a relative rotational force applied to said coupling members so as to permit said pin to move past said detent into or out of one of said notches, the resiliency of the material out of which said thin walled tube and tubular part are formed providing a spring action for said detent and pin.

3. In a coupling for suction cleaner attachments, a thin walled tube forming an air conducting male coupling member, an air conducting socket coupling member adapted to telescopically and freely rotatably receive said male coupling member, at least the end of said socket coupling member being formed by a thin walled tubular part, said end of said socket coupling member being provided with an annularly extending internal groove having an entrance opening in the end wall thereof, the walls of said groove being formed at least in part by said thin walled tubular part which is deformed to provide a notch at one side of said entrance opening and a detent between said entrance opening and said notch, said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past said detent into said notch, said thin walled tube and tubular part being adapted to distort when said detent is pressed against said pin by a relative rotational force applied to said coupling members so as to permit said pin to move past said detent into or out of said notch, the resiliency of the material out of which said thin walled tube and tubular part are formed providing a spring action for said detent and pin.

4. In a coupling for suction cleaner attachments, an air conducting male coupling member, an air conducting socket coupling member adapted telescopically and freely rotatably to receive said male coupling member, said coupling members having at least the ends thereof formed of thin walled material, the end of said socket coupling member being provided with an annular projection forming an internal transverse slot having an entrance opening in the end wall thereof, the walls of said slot being deformed to provide a notch at one side of said entrance opening and a detent between said entrance opening and said notch, said male coupling member being provided with a pin which is adapted to be arranged in said slot through the entrance opening therein when said male coupling member is inserted in said socket coupling member, said slot cooperating with said pin to limit the penetration of said male coupling member into said socket member, relative rotation of said coupling members when said pin is so arranged being adapted to move said pin past said detent into said notch, said ends of said coupling members being adapted to distort when said detent is pressed against said pin by a relative rotational force applied to said coupling members so as to permit said pin to move past said detent into said notch, the resiliency of the material out of which said ends are made permitting temporary displacement of said pin while moving past said detent.

5. In a coupling for suction cleaner attachments, an air conducting male coupling member, an air conducting socket coupling member adapted to telescopically and freely rotatably receive said male coupling member, said coupling members being formed of thin walled material, the end of said socket coupling member being provided with a bead forming an annularly extending internal groove having an entrance opening in the end wall thereof, the walls of said groove being provided with indentations forming a notch at one side of said entrance opening and a detent between said entrance opening and said notch, said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past said detent into said notch.

6. In a coupling for suction cleaner attachments, an air conducting male coupling member, an air conducting socket coupling member adapted to telescopically and rotatably receive said male coupling member, said coupling members having at least the coupling ends thereof formed of thin walled material, the end of one of said coupling members being provided with an annularly extending projection forming a transverse slot having an entrance opening in the end wall thereof, the walls of said slot being formed to provide a notch at one side of said entrance opening and a detent between said entrance opening and said notch, the other of said coupling members being provided with a part which is adapted to be arranged in said slot through the entrance opening therein when said male coupling member is inserted in said socket coupling member, said slot cooperating with said part to limit the penetration of said male coupling member into said socket member, relative rotation of said coupling members when said part is so arranged being adapted to move said part past said detent into said notch.

7. In a coupling for suction cleaner attachments, an air conducting male coupling member, an air conducting socket coupling member adapted to telescopically and freely rotatably receive said male coupling member, said coupling members having at least the coupling ends thereof formed of thin walled material, the end of said socket coupling member being provided with a bead forming an annularly extending internal groove having an entrance opening in the end wall thereof, the walls of said bead being indented radially to provide a notch at each side of said entrance opening with a detent between said entrance opening and each of said notches, said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past one of said detents into one of said notches.

8. In a coupling for suction cleaner attachments, an air conducting male coupling member, an air conducting socket coupling member adapted to telescopically and freely rotatably receive said male coupling member, said coupling members having at least the coupling ends thereof formed of thin walled material, said end of said socket coupling member being provided with a bead forming an annularly extending internal groove having an entrance opening in the end wall thereof, the walls of said bead being indented axially to provide a notch at each side of said entrance opening with a detent between said entrance opening and each of said notches, said male coupling member being provided with a pin which is adapted to be arranged in said groove through the entrance opening therein when said male coupling member is inserted in said socket coupling member, said groove cooperating with said pin to limit the penetration of said male coupling member into said socket member, relative rotation of said coupling members when said pin is so arranged being adapted to move said pin past one of said detents into one of said notches.

9. In a coupling for suction cleaner attachments, an air conducting male coupling member, an air conducting socket coupling member adapted to telescopically and freely rotatably receive said male coupling member, said coupling members having at least the coupling ends thereof formed of thin walled material, said end of said socket coupling member being provided with an annular projection forming an internal transverse slot having an entrance opening in the end wall thereof, the walls of said slot being indented radially to form a notch at each side of said entrance opening and a detent between said entrance opening and each of said notches, said male coupling member being provided with a pin which is adapted to be arranged in said slot through the entrance opening therein when said male coupling member is inserted in said socket coupling member, said slot cooperating with said pin to limit the penetration of said male coupling member into said socket member, relative rotation of said coupling members when said pin is so arranged being adapted to move said pin past one of said detents into one of said notches.

10. In a coupling for suction cleaner attachments, an air conducting male coupling member, an air conducting socket coupling member adapted telescopically and freely rotatably to receive said male coupling member, said coupling members having at least the coupling ends thereof formed of thin walled material, said end of said socket coupling member including an annular sleeve arranged on said socket coupling member and cooperating therewith to form an internal transverse slot having an entrance opening in the end wall thereof, the walls of said slot being formed to provide a notch at each side of said entrance opening and a detent between said entrance opening and said notch, said male coupling member being provided with a pin which is adapted to be arranged in said slot through the entrance opening therein when said male coupling member is inserted in said socket coupling member, said slot cooperating with said pin to limit the penetration of said male coupling member into said socket member, relative rotation of said coupling members when said pin is so arranged being adapted to move said pin past said detent into said notch.

KEMPER M. HAMMELL.

REFERENCES CITED

The following references are of record in the file of this patent:

UNITED STATES PATENTS

| Number | Name | Date |
|---|---|---|
| 437,915 | Costigan | Oct. 7, 1890 |
| 1,038,840 | Brookfield | Sept. 17, 1912 |